Figure 1:
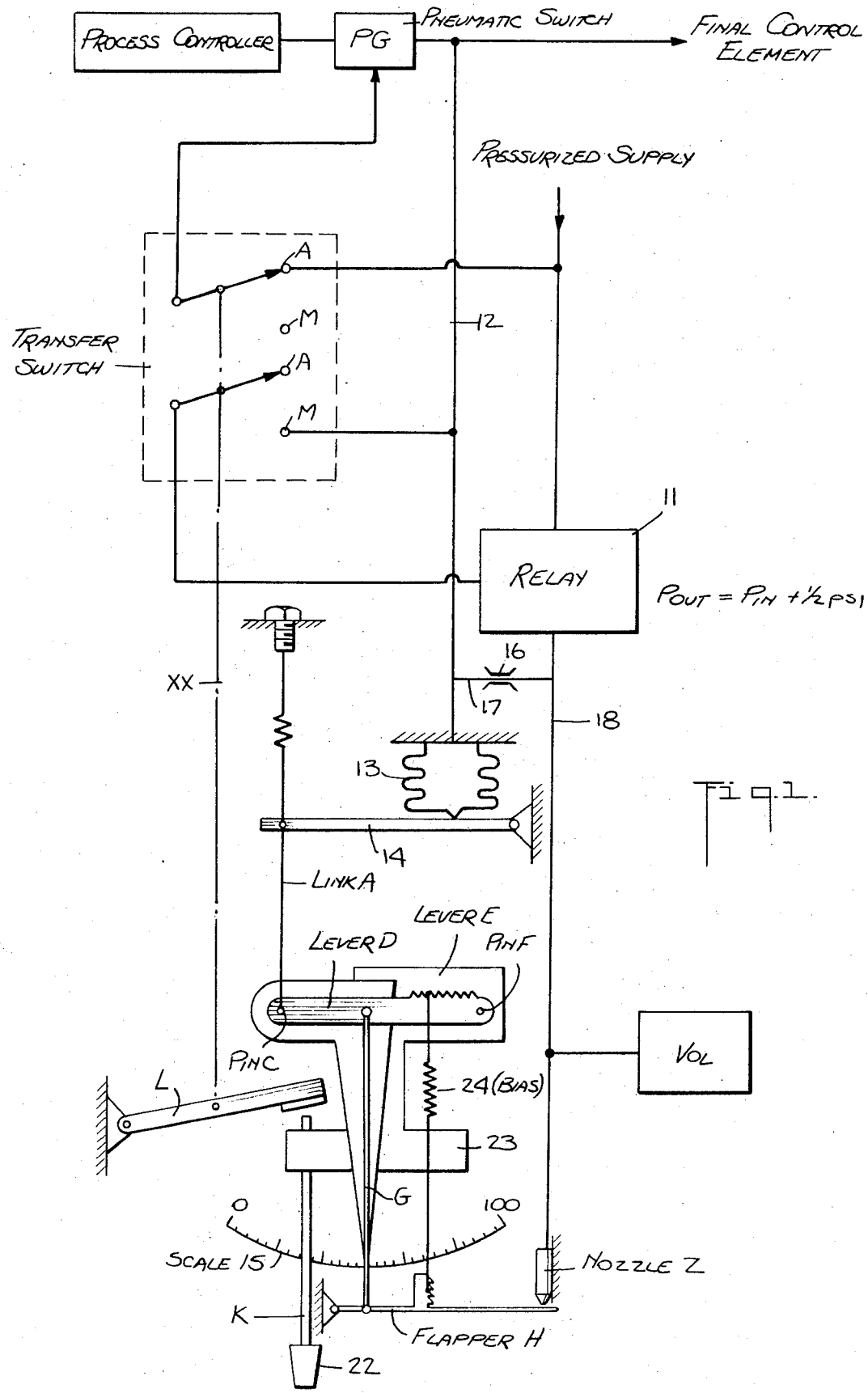

United States Patent [19]
Grier et al.

[11] 3,861,453
[45] Jan. 21, 1975

[54] RECEIVER-TRANSMITTER UNIT FOR PROCESS CONTROL SYSTEM

[75] Inventors: David G. Grier, Elkins Park; Gerard P. Albright, Hatboro; David G. Rees, Telford, all of Pa.

[73] Assignee: Fischer & Porter Co., Warminster, Pa.

[22] Filed: Sept. 25, 1973

[21] Appl. No.: 400,688

[52] U.S. Cl. .............................. 137/85, 137/DIG. 1
[51] Int. Cl. ........................ F15b 5/00, G05b 16/00
[58] Field of Search ............ 137/85, 86, 82, DIG. 1, 137/84

[56] References Cited
UNITED STATES PATENTS
| | | | |
|---|---|---|---|
| 3,525,351 | 8/1970 | Bowditch | 137/85 |
| 3,680,580 | 8/1972 | Beardsley | 137/86 |

*Primary Examiner*—Alan Cohan

[57] ABSTRACT

A fluid-operated receiver-transmitter unit usable as a manual control station in conjunction with the controller of an automatic process control system. The unit is capable of transference from a receiver or automatic mode in which an input fluid pressure derived from the process control system is indicated, to a transmitter or manual mode in which an output fluid pressure is supplied to the system to adjust the final control element thereof, the initial value of the transmitted pressure corresponding to the received value of input pressure just before transfer, thereby effecting a bumpless transfer. To provide a safe level of output pressure in the event of a failure in the controller, the unit is also transferable from the manual mode to a preset manual mode in which the transmitted output pressure is at a previously established safe level.

11 Claims, 2 Drawing Figures

RECEIVER-TRANSMITTER UNIT FOR PROCESS CONTROL SYSTEM

BACKGROUND OF THE INVENTION

This invention relates generally to process control systems, and more particularly to a fluid-operated receiver-transmitter unit.

Many industrial processes are operated by means of one or more final control elements, such as valves, which govern the supply of fuel or other liquid to the process. Such final control elements may be operated by a manual control system or by an automatic control system.

Automatic control may be effected pneumatically by a controller such as that disclosed in the Wiseman U.S. Pat. No. 3,354,895 wherein the controller which is a component in a process control loop subject to disturbances, acts to maintain a process variably at a desired value. To accomplish this purpose, the pneumatic controller receives in terms of motion, both the desired value or set point and the process variable, the controller functioning as a motion balance device to position the final control element which directly affects the process variable being controlled. The variable controlled may be flow rate, temperature pressure or any other process variable. Thus the input motion of the controller may be obtained from a rate-of-flow meter whose reading is translated into a mechanical motion that is applied to the input lever of the pneumatic controller.

In the operation of the pneumatic controller, an error signal representing a deviation of the process variable from the desired set point acts upon an input mechanism to produce through a flapper-nozzle element a change in fluid pressure. This change is detected in a pilot relay and controls a feedback bellows assembly which acts upon the input mechanism to bring about a change in the adjustment of the flapper-nozzle element, thereby producing a change in fluid pressure which causes the pilot relay to produce an output change. This output change is applied to the final control element to restore the variable being controlled to its set value.

In the Rohmann et al. U.S. Pat. No. 3,223,106 and in the Bowditch et al. U.S. Pat. No. 3,525,351, there are disclosed fluid-operated receiver-transmitter units which are used as a manual control station in conjunction with an automatic control system. The units disclosed in these patents are capable of shifting modes (that is, going from automatic to manual control operation or vice versa) in a bumpless fashion without intermediate, time-consuming matching or balancing procedures.

Bumpless transfer is particularly advantageous if the final control element controls an industrial process, for changes in the position of the final control element cause changes in the industrial process. These changes cannot be quickly eliminated and consequently there is a disturbance of the process under control and a resulting loss of efficiency or damage to the apparatus carrying out the process or to the plant in which the apparatus is housed.

For example, let us assume that under automatic control, the temperature of a process is governed by a final control element in the form of a valve controlling the supply of heated fluid into the process, and the controller functions to maintain the temperature of the process at a desired value. If a transfer is suddenly made from automatic to manual control, the valve position will be radically changed should the initial setting of the manual control station be far removed from the setting of the automatic control system at the time of transfer. But with bumpless transfer, the setting of the manual control system tracks that of the automatic control system so that at the time of transfer, there is no disparity therebetween and no change occurs in the valve position.

The difficulty with manual control systems of the type heretofore known wherein a bumpless transfer is effected from one mode to another is that it does not take into account a possible failure of the automatic control system. Should this happen, it will give rise to a tracked value in the manual system that no longer represents a safe or proper setting. Hence, should one effect a bumpless transfer from a defective automatic control system to a manual control system, then the output pressure signal supplied by the manual control system to the pneumatic motor for the final control element may be altogether inappropriate and possibly dangerous.

SUMMARY OF THE INVENTION

In view of the foregoing, the main object of this invention is to provide an improved fluid-operated, receiver-transmitter unit which is selectively transferable from a receiver or automatic mode to a transmitter or manual mode, said transfer being effected in a bumpless fashion without intermediate steps.

A salient feature of the invention is that the unit in the manual mode is transferable to a preset manual mode to produce an output pressure signal which is transmitted to an associated final control element, the signal having a safe value which is independent of the input received by the unit whereby a safe output pressure signal may be generated in the event the controller fails.

Also an object of this invention is to provide a unit of the above-type which operates efficiently and reliably and which may be manufactured at low cost.

Briefly stated, in a unit in accordance with the invention, there is provided a pressure-sensitive element coupled to an input-output line leading to an automatic process control system, the unit receiving an input fluid signal from said system in the receiver or automatic mode and sending an output fluid signal to said system in the manual or transmitter mode.

The output of a pneumatic relay supplied by a pressurized fluid is coupled to said line through a pneumatic switch only when the switch occupies its transmitter mode position.

Connected directly to the input of the relay is the nozzle of a flapper-nozzle assembly, the nozzle being coupled through a restrictor to said line. A linkage mechanism is operatively coupled to the pressure-sensitive element and is linked to said flapper to vary the position thereof as a function of input pressure supplied to said element, said linkage mechanism including a manual control lever whose angular position determines the position of the flapper relative to the nozzle.

Manual mode means are provided to vary the angular position of the control lever to vary the output of the relay. Preset manual control means are provided for shifting said lever to a predetermined position producing an output representing a safe value, which value is independent of the received pressure value such that should the controller fail, the output value will maintain the process without danger thereto.

OUTLINE OF THE DRAWING

Figure 2:
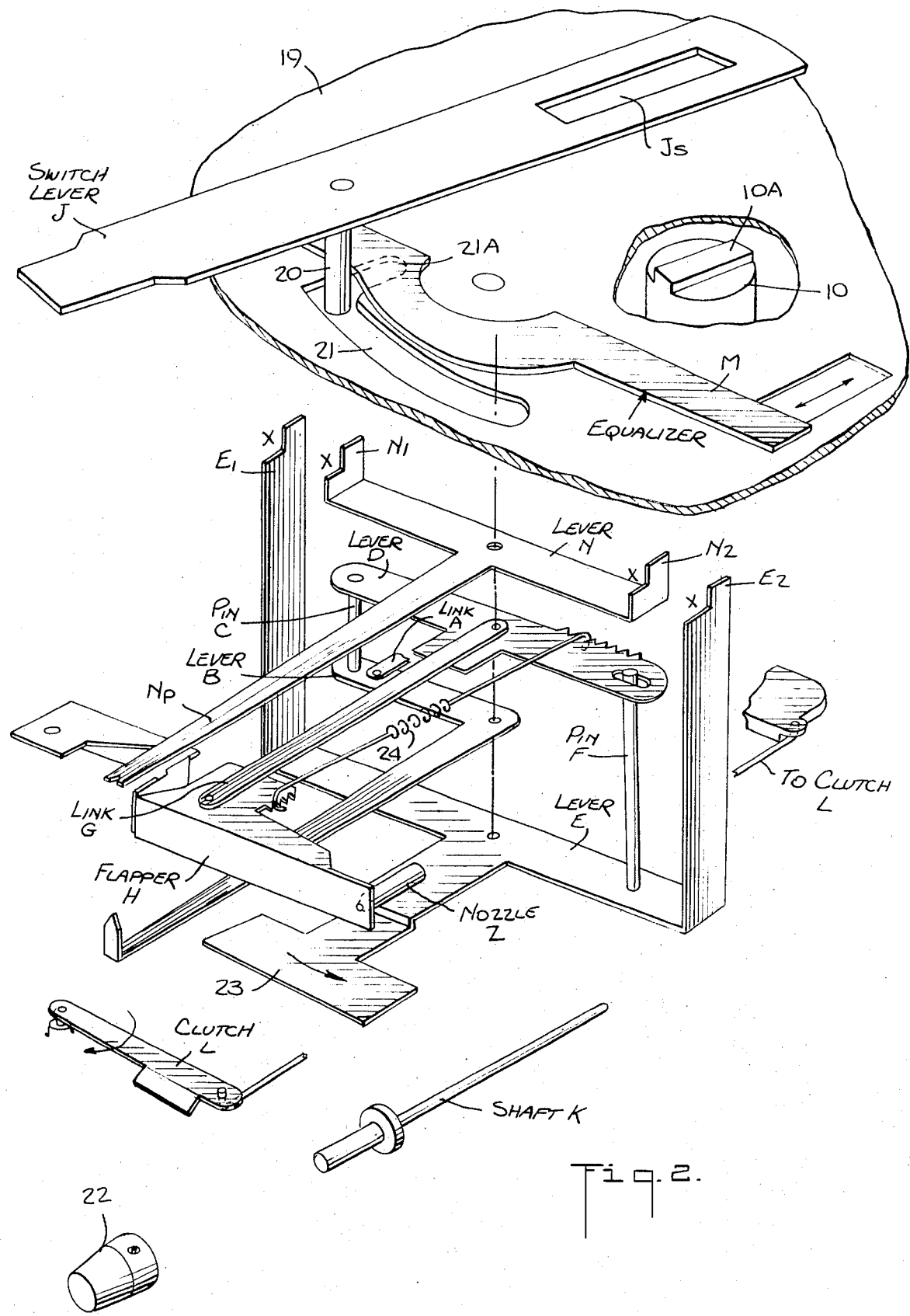

For a better understanding of the invention as well as other objects and further features thereof, reference is made to the following detailed description to be read in conjunction with the accompanying drawing, wherein:

FIG. 1 is a schematic diagram of a fluid-operated receiver-transmitter unit in accordance with the invention, the linkage elements therein being incompletely shown to simplify the schematic; and FIG. 2 illustrates the details of the linkage elements included in the unit.

DESCRIPTION OF THE INVENTION

Referring now to FIGS. 1 and 2 there is shown a pneumatic receiver-transmitter unit in accordance with the invention, the unit capable of operating selectively in the automatic or receiver mode, or in the manual or transmitter mode, or in a preset manual mode. FIG. 1 schematically illustrated the basic components of the unit, the linkage structure being simplified, whereas FIG. 2 shows this structure in greater detail.

AS shown in FIG. 1, the unit includes a pneumatic transfer switch 10 having a manual mode M position and an automatic mode A position. In the manual mode position, switch 10 connects the output pressure signal yielded by a pneumatic relay 11 to an input-output line 12 for transmission to the final control element of an associated process control system. In this system, the output of a process controller PC is fed through a pneumatic gate PG to the final control element. In the manual mode, no activating pressure is applied to the gate, hence the process controller is disconnected from the final control element which is now under the manual control of the unit.

In the automatic or receiver mode, gate PG is activated and input pressure derived from process controller PC is fed through line 12 to a pressure-responsive bellows 13 which expands or contracts as a function of the applied pressure to vary the position of a pivoted arm 14 whose free end is coupled by a link A to an input lever B.

Input lever B is provided with a pointer operating along a scale 15. Thus the motion of the pressure-sensitive element of the unit is translated to a pointer position which is indicated on scale 15. The position of input lever B is referred by means of a pin C, (see FIG. 2) to a lever D whereby one end of lever D tracks input lever B.

A manual control lever E pivoted on the same center as lever B, is connected to lever D through a pin F. It will be seen that if the center hole CH of lever D is retained in a fixed position directly on the center line CL of rotation of both levers B and E, then lever E will be compelled to rotate in direct response to the movement of input lever B. Thus if manual control lever E is free to rotate, it will assume a definite position directly related to each possible position of input lever B. Otherwise stated, manual control lever E is forced to track input lever through lever D.

The center of lever D is connected by a link G to a pivoted flapper H which cooperates with a nozzle Z attached to a fixed ground point. The flapper-nozzle assembly acts as a displacement sensing device to translate small changes in physical dimension into related changes in fluid pressure. Fluid to the nozzle Z is fed via a restrictor 16 through line 17, as shown in FIG. 1. The nozzle Z is directly connected to the input of relay 11 by a line 18 to provide a back-pressure signal for actuating the pneumatic relay in the usual manner.

Pneumatic switch 10, as shown in FIG. 2, is in rotary form and is operated by a switch lever J extending therefrom. For this purpose the head of the switch is provided with a ridge 10A which is received with a longitudinal slot $J_s$ formed in the related end of lever J. Switch lever J lies on a mounting plate 19 and is provided with a downwardly projecting pin 20 which rides within an arcuate slot 21 having a lateral extension 21A at the left end thereof which permits limited axial movement of switch lever J in its manual mode position, which is the left position shown in FIG. 2. When the switch lever J is shifted to the right to occupy its automatic or receiver mode position, axial movement of the switch lever J is prevented by slot 21.

When the function of the unit is changed over to the transmitter mode by moving switch lever to the manual position (extreme left), it will carry out certain pneumatic switch changes. The rotation of switch 10 acts through link XX to pull a clutch lever L which underlies a shaft K operated by a control knob 22. When the clutch lever is pulled, its cam surface raises shaft K into frictional engagement with the undersurface of a wing plate 23 extending laterally from the center of manual control lever E.

Manual control lever E, which was forced to track input lever B in the receiver mode to assume a position reflecting the value of input pressure, is now retained in position by shaft K in engagement therewith. The output of relay 11, which is controlled by the flapper-nozzle assembly, now represents the output of the unit acting as a transmitter, with the transmitted pressure being sensed in the same manner that the received pressure was indicated. The linkage to the flapper-nozzle assembly makes the unit function as a closed loop device, with the lever D linked through link G to flapper 11 sensing any changes in either the output pressure or the desired value as determined by manual control lever E.

Thus in the receiver mode, the input value is translated into a positional change of lever E and this position, when switching to the transmitter mode, is clamped and held to determine the output pressure, thereby effecting a bumpless transfer.

For example, to increase the pressure transmitted by the unit, shaft K is turned by knob 22 in the clockwise direction, as shown by the arrow, to shift sector plate 23 to the right, thereby swinging lever E about its center. Since lever E is connected to lever D by pin F, this action moves lever D toward the rear, thereby pulling flapper H which is linked to lever D, against nozzle Z.

This manually produced change gives rise to an increase in the pressure in the nozzle line and in relay 11. This increase is sensed by pressure sensing element 13 which then acts to reposition input lever B and ultimately the flapper nozzle in the same manner as in any closed loop system. Thus the unit which in this condition is operating as a transmitter, is transferable in bumpless fashion from an initial receiving or indicating mode to a transmitter or manual mode.

While in the receiver or automatic mode position, the flapper nozzle will be closed, permitting the output of relay 11 to build up excessively. when switching from the automatic or receiving mode to the manual or transmitting mode, some period of time is required to this excessive pressure to drop to the desired value. For this reason a different pneumatic circuit is used, called regenerative feedback.

This regenerative circuit will prevent excessive buildup of the flapper-nozzle and relay output pressure. The pressure-to-nozzle circuit is obtained from the output pressure or from the pressure to the pressure sensing element. Thus while in the automatic mode, the nozzle circuit is supplied by the input pressure and is, of course, limited to the value thereof. When switching to the manual mode, the relay whose output is equal to the nozzle pressure plus 0.5 psi (Pout=Pin + 0.5 psi) will then close to the proper value without surging.

The relay output pressure is kept at 0.5 psi greater than the input so that the nozzle will always have some minimum pressure to start up. Even if the input went to zero, the output pressure would still be 0.5 psi which would supply the restriction 16 to the nozzle A.

In addition to the above-described means of reducing the surge upon shifting from one mode to another, an additional problem exists. In normal transmitter operation, there is a gap between the flapper and the nozzle. This gap varies with the operating level. Thus as the unit is operated through its minimum to maximum output range, the nozzle-flapper clearance changes. In the automatic mode position, if the flapper is permitted to close completely, the linkage must shift some small amount when switching to manual. This shift will appear as a small bump in the output.

To reduce this value to a minimum, a light spring 24 is connected between the flapper H and a selected point between 1 and 2 on lever D. The edge of lever D is serrated between points 1 and 2 whereby a hook attached to the end of spring 24 may be set along this edge to a desired position. At a given operating pressure in the automatic mode, the nozzle pressure has a known value which is applied to nozzle Z and impinges on the flapper. If spring 24 is adjusted so that this jet force as applied to the flapper, opens the flapper, with exactly the same amount of force as would be the case in the manual operation, no change in the position of the levers will occur as the unit is switched from one mode to the other. Thus no bump would occur.

If spring 24 were attached between the flapper and a fixed point, this condition would only be correct for one value of pressure. At any other value, say a higher pressure, the jet force of the nozzle would be greater and thus the clearance between the flapper and the nozzle would be greater. For a higher pressure, however, from a flapper-nozzle system, the clearance should be less since bringing the flapper closer to the nozzle will increase the back pressure. When switching, some change in the linkage would then have to occur to correct for the nozzle clearance and thus a bump occurs.

To avoid this, the spring is attached to a point between 1 and 2 on the lever D. It can be seen that this point on the lever is directly related to pressure level. This lever moves away from the flapper lever at higher pressures, thus pulling on one end of the spring. This, therefore, causes a higher force on the lever counteracting the nozzle pressure and reducing the clearance between the flapper and nozzle, which is the desired result.

We shall now describe the preset manual mode of operation which permits one to obtain from the unit an output pressure that had previously been determined to be desirable in the event of a failure somewhere in the process control system. When the preset manual mode is rendered operative, the output pressure is then at a value previously determined as being safe, which preset value is independent of the value produced when transferring from automatic to manual, for the latter value cannot be relied on because of a failure in the associated control system.

The present manual value is set by means of a lever N having raised tabs $N_1$ and $N_2$ at either end, a pointer Np extending laterally from this lever. Lever N is set by shifting pointer Np extending laterally from the center thereof, longitudinally along scale 15, the lever N being then held fixed at this position by means of a friction spring washer.

When it is desired to transfer the unit to the preset manual mode, the switch lever J, in its manual position, is pushed in to cause pin 20 to ride in slot extension 21A, the pin engaging floating equalizer beam M. As equalizer beam M is pushed toward the rear by pin 21A, it engages the notches marked X on the upper ends of vertical extension $E_1$ and $E_2$ on manual control lever E. The lever E is driven rearwardly until the notches marked X on its extensions $E_1$ and $E_2$ are in alignment with the complementary notches marked X in tabs $N_1$ and $N_2$ of lever N, which lever is rigidly fixed in position.

Since lever E, while in manual, determines the output pressure of the device and since slippage will occur between shaft K and the surface of sector 23 on lever E, the output pressure will immediately jump to the preset value established by the lever N. On releasing switch lever J, it will move outward due to the springs (not shown) on equalizer beam M. If further adjustment of output pressure is desired at any time, shaft K can be rotated and the pressure will be caused to change in the normal manner.

While there has been shown and described a preferred embodiment in accordance with the invention, it will be appreciated that many changes and modifications may be made therein without, however, departing from the essential spirit of the invention.

We claim:

1. A fluid-operated receiver-transmitter unit operable in conjunction with an automatic process control system including a controller which supplies operating fluid to the motor of a final control element, said unit being selectively capable of functioning in three modes, the first mode being a receiver mode in which operating fluid is supplied to the motor of the control element in accordance with a manual operation and independently of said controller, the second mode being a transmitter mode in which operating fluid is supplied to said motor by said controller, the third mode being a preset manual mode in which operating fluid is supplied to said motor at a predetermined level which is independent of said controller and of said manual operation, said unit comprising:

A. means in said receiver mode to translate an incoming fluid signal derived from the system into a receiver position representing the value of the incoming signal, B. means in said transmitter mode to translate the receiver position into a corresponding transmitter position and to supply to said system an initial fluid output signal representing said transmitter position, whereby a transfer from the receiver mode to the transmitter mode is effected in a bumpless manner, and, C. means in said preset manual mode to produce a fluid output signal whose value is independent of said transmitter position established in said transmitter mode and is based on a previously established safe value whereby, should the controller fail, one may supply to said system a signal which maintains a safe operation.

2. A unit as set forth in claim 1 further including a pneumatic switch to transfer said unit from the receiver to the transmitter mode.

3. A unit as set forth in claim 1 further including a manually operated mechanism to vary the value of said output signal from said initial value.

4. A unit as set forth in claim 1 wherein said means in the receiver mode includes an indicator responsive to said receiver position.

5. A unit as set forth in claim 4 wherein said means in the receiver mode includes a pressure-sensitive element responsive to said incoming fluid signal and a linkage mechanism operatively coupled to the element to actuate said indicator.

6. A fluid-operated, receiver-transmitter unit operable in conjunction with an automatic process control system including a controller which supplies operating fluid to the motor of a final control element, said unit being selectively capable of operating in an automatic mode or in a manual mode or in a preset manual mode, said unit comprising:

A. a pressure-sensitive element coupled to an input-output line leading to said automatic process control system;

B. a pneumatic relay supplied by a pressurized fluid, the output of said relay being connected to said line through a pneumatic switch only when the switch occupies its manual mode position;

D. a flapper-nozzle assembly, the nozzle being connected directly to the input of the relay;

D. a linkage mechanism operatively coupled to said pressure sensitive element and linked to said flapper to vary the position thereof as a function of fluid pressure supplied to said element, said linkage mechanism including a manual control lever whose angular position determines the position of said flapper relative to said nozzle;

E. means to manually vary the angular position of said control lever to vary the output of said relay; and F. preset manual control means for shifting said lever to a predetermined position independently of said last mentioned means producing an output representing a safe value.

7. A unit as set forth in claim 1, wherein said manual control lever is provided with a sector plate which in the manual mode is engaged by a knob-operated shaft which when turned varies the angular position of said lever.

8. A unit as set forth in claim 1 wherein said linkage mechanism includes an input lever operatively coupled to said pressure-sensitive element, and an indicator lever linked to said input lever and movable therewith to provide an indication of input pressure applied to said element.

9. A unit as set forth in claim 8, wherein said manual control lever is linked to said indicator lever, whereby said manual control lever tracks said input lever.

10. A unit as set forth in claim 9, wherein said preset manual control means includes a presettable lever whose position relative to the manual control lever is settable whereby said presettable lever is caused to assume a predetermined fixed position, and an equalizer beam which is shiftable by an operator to cause said control lever to assume a position aligned with said presettable lever.

11. A unit as set forth in claim 10, further including a switch lever for operating the pneumatic switch, said switch lever being movable longitudinally and having a pin projecting therefrom to engage said equalizer beam to shift same.

* * * * *

UNITED STATES PATENT OFFICE
CERTIFICATE OF CORRECTION

Patent No. 3,861,453                     Dated January 21, 1975

Inventor(s) David G. Grier, Gerard P. Albright and David G. Rees

It is certified that error appears in the above-identified patent and that said Letters Patent are hereby corrected as shown below:

Col. 5, line 3 "when" should have read -- When --
       line 5 "to" should have read -- for --

Col. 6  line 14 "present" should have read -- preset --

Col. 7  last line "D." should have read -- C. --

Signed and sealed this 11th day of March 1975.

(SEAL)
Attest:

RUTH C. MASON
Attesting Officer

C. MARSHALL DANN
Commissioner of Patents
and Trademarks